(12) United States Patent
Mao

(10) Patent No.: US 8,256,290 B2
(45) Date of Patent: Sep. 4, 2012

(54) TRI-AXIS ANGULAR RATE SENSOR

(76) Inventor: Minyao Mao, Santa Rosa, CA (US)

( * ) Notice: Subject to any disclaimer, the term of this patent is extended or adjusted under 35 U.S.C. 154(b) by 590 days.

(21) Appl. No.: 12/405,974

(22) Filed: Mar. 17, 2009

(65) Prior Publication Data

US 2010/0236327 A1 Sep. 23, 2010

(51) Int. Cl.
*G01C 19/00* (2006.01)
*G01P 3/44* (2006.01)
*G01P 9/00* (2006.01)
*G01P 15/08* (2006.01)

(52) U.S. Cl. .................. 73/504.12; 73/488; 73/504.02

(58) Field of Classification Search ............ 73/504.02, 73/504.04, 504.09, 504.12, 504.18
See application file for complete search history.

(56) References Cited

U.S. PATENT DOCUMENTS 5,349,855 A * 9/1994 Bernstein et al. .......... 73/504.16

OTHER PUBLICATIONS

Author: Nan-Chyuan, Tsai, Chung-Yang, Sue, Chih-Che, Lin; Title: "Design and dynamics of an innovative micro gyroscope against coupling effects"; Date: Jan. 8, 2008; Publisher: Springer-Verlag; Edition: Microsys Technol (2008), Technical Paper; vol. 14; pp. 295-306.*

* cited by examiner

*Primary Examiner* — Lisa Caputo
*Assistant Examiner* — Roger Hernandez-Prewitt

(57) ABSTRACT

Angular rate sensor for detecting rotation about first, second and third mutually perpendicular input axes having a plurality of generally planar proof masses coupled together for linear drive-mode oscillation along multi-directional drive axes in a plane formed by the first and second input axes. The masses are mounted on a generally planar sense frame for linear movements relative to the sense frame in drive-mode and for rotation together with the sense frame in sense modes. The sense frame is mounted for rotation with the masses in sense modes about the first, second, and third input axes independent of each other, in response to Coriolis forces produced by rotation of the masses about the first, second, and third input axes respectively. And capacitance sensors responsive to the rotational movements of the masses and the sense frame in sense modes are employed for monitoring rate of rotation.

24 Claims, 15 Drawing Sheets

TRI-AXIS ANGULAR RATE SENSOR

BACKGROUND OF THE INVENTION

1. Field of Invention

This invention pertains generally to angular rate sensors or gyroscopes, and more particularly, to a rate sensor for monitoring rotation about three input axes.

2. Related Art

Many applications in automotive and consumer markets require measurements of angular rate about three mutually perpendicular axes. Currently, the most common solution is to use three separate rate sensors with each measuring rotation about one axis. However, that solution requires three separate sensors and three independent integrated circuits for drive control and sensing.

OBJECTS AND SUMMARY OF THE INVENTION

It is in general an object of the invention to provide a new and improved angular rate sensor or gyroscope.

Another object of the invention is to provide a rate sensor or gyroscope of the above character, which overcomes the limitations, and disadvantages of rate sensors of the prior art.

These and other objects are achieved in accordance with the invention by providing an angular rate sensor for detecting rotation about first, second and third mutually perpendicular input axes having a substrate, a plurality of generally planar proof masses coupled together for linear drive-mode oscillation along multi-directional drive axes in the plane of the masses which contains the first and second input axes, means for driving the masses to oscillate in drive-mode, a planar sense frame disposed in the plane of the masses, means for mounting the masses to the sense frame for linear movements relative to the sense frame in drive-mode and for rotation with the sense frame in sense modes, means for mounting the sense frame on the substrate for rotation with the masses about the first, second, and third input axes independent of one another in response to Coriolis forces produced by rotation of the masses about the first, second, and third input axes respectively, means responsive to the rotational movement of the sense frame and the masses about the input axes for monitoring rate of rotation.

DETAILED DESCRIPTION

Figure 1:
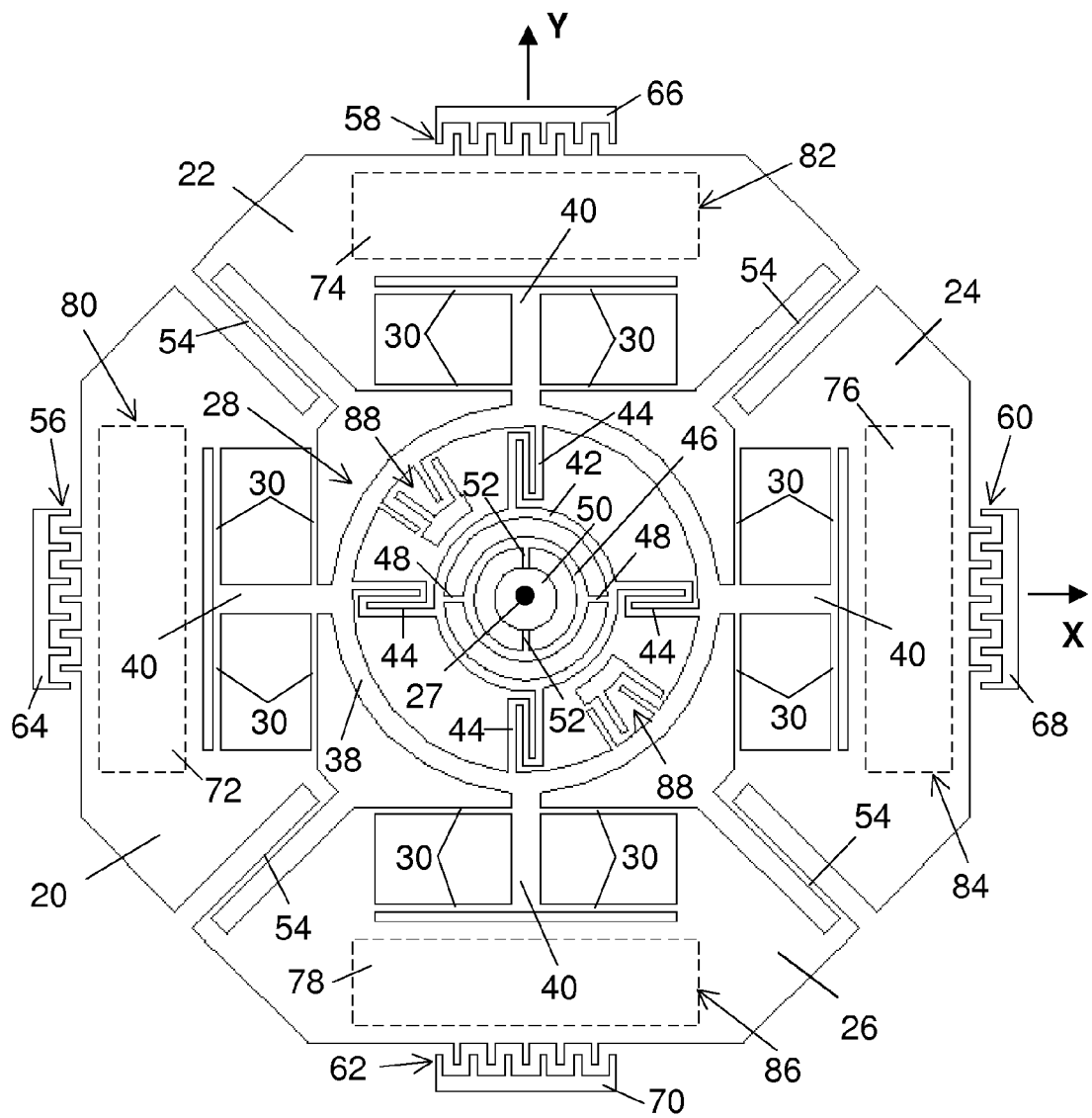
FIG. 1 is a top plan view of one embodiment of a tri-axis rate sensor according to the present invention.

As illustrated in FIG. 1, the rate sensor has four generally planar butterfly-wing-shaped proof masses 20, 22, 24, 26 that lie in an x, y reference plane when the device is at rest. The proof masses are disposed around a center 27, which is the intersecting point of the x- and y-axes, with mass 20, 24 lying along the x-axis, and mass 22, 26 along the y-axis.

The proof masses are mounted on a supporting frame, or sense frame, 28 by flexible beams, or flexures, 30. These flexures constrain each one of the masses for linear movement in drive-mode relative to the sense frame along a predetermined axis, which is the drive axis of that mass. The drive axes of mass 20, 24 are in the x-axis, and the drive axes of mass 22, 26 are in the y-axis.

The flexures for each mass are relatively flexible in the direction along the drive axis of the mass, but relatively stiff in other directions. The use of multiple sets of flexures for each mass further suppresses possible relative movements between the mass and the sense frame except the linear movement along the drive axis of the mass.

Like the masses, sense frame 28 is generally planner and disposed in the x, y plane with the masses. It includes a rigid ring 38 and stems 40. The ring has its center coincident with center 27, which is also the center of the device. Each stem is affixed to the ring and extends into the inner sides of a proof mass along its drive axis, for mounting the mass by flexures 30.

Ring 38 is mounted to a gimbal 42 by flexures 44 that extend in radial directions from the ring. Each such flexure is relatively stiff in its longitudinal, or radial direction, but relatively flexible in the lateral direction, which is in the plane of the masses and perpendicular to the longitudinal direction. They constrain the sense frame for rotation relative to gimbal 42 about the z-axis, which is perpendicular to the x, y plane and intersects with the plane at center 27.

Gimbal 42 is further pivotally mounted to another gimbal 46 by a pair of torsion beams 48, which extend along the x-axis, for rotation relative to gimbal 46 about the x-axis. And gimbal 46 is further mounted to an anchor post 50, which is affixed to a substrate (not shown), by a pair of torsion beams 52, which extend along the y-axis for rotation about the y-axis. The suspension structure, which includes members 42 to 52, mounts the sense frame on the substrate and permits it to rotate with the masses about the x-, y-, and z-axes independently of one another.

It can be seen, multiple rotation members 44, 48, 52 in the suspension structure are connected in series by gimbals 42, 46. It is apparent that the sequence of connection, or the order of rotation members in the suspension structure can be varied to achieve the same function of rotation. This embodiment illustrates only one of many possible sequences.

The proof masses are coupled together by coupling springs, or link beams, 54 connected between adjacent ones of the masses. The adjacent masses are referred to two neighboring masses along a circumferential direction around the center of the device. Under this definition, for example, masses 20, 22 are a pair of adjacent masses, but masses 20, 24 are not, because they are not neighboring in a circumferential direction. Each link beam extends in a radial direction that forms approximately equal angles to the two drive axes of the adjacent masses, i.e. at angle of 45 degrees to the x- and y-axes.

A link beam prohibits two adjacent masses it connects to move relative to each other in directions parallel to its longitudinal axis, which is in radial direction, and permits relative movements only in its lateral direction, which is perpendicular to the longitudinal direction. Thus, it constrains the adjacent masses to move in a cooperative manner along their drive axes.

For an example, when mass 20 moves along the x-axis in the direction away from center 27, due to the constraint of the link beam connected between mass 20 and 22, mass 22 has to move away from the center accordingly, along its drive axes in the y-axis. Thus, the two adjacent masses oscillate along their own drive axes with exact same phase, or in in-phase manner.

This forms the drive-mode of the proof masses, i.e. the masses oscillating along their own drive axes in in-phase manner with respect to one another. And this drive-mode is the lowest vibration mode of the masses in the system under this coupling design.

The proof masses are driven by comb drive actuators 56, 58, 60, 62, which have movable fingers mounted to the proof masses and interleaved with stationary fingers affixed to anchored electrodes 64, 66, 68, 70. Actuators 56, 60 have comb fingers parallel to the x-axis for driving masses 20, 24 to oscillate along the x-axis, and actuators 58, 62 have fingers parallel to the y-axis for driving masses 22, 26 to oscillate along the y-axis.

Electrode plates 72, 74, 76, 78 are mounted on the substrate beneath proof masses 20, 22, 24, 26 and form capacitors 80, 82, 84, 86 with the proof masses respectively. These capacitors are used to monitor the out-of-plane movement of the masses, i.e. rotation of the masses about the x-, and y-axes. Multiple parallel plate capacitors 88 which have movable electrode plates mounted on ring 38 and interleaved with stationary plates affixed to the substrate are employed to monitor the in-plane rotation movement of the sense frame, i.e. rotation of the sense frame about the z-axis. These parallel plate capacitors extend generally in radial directions from ring 38 in the plane of the masses.

In operation, drive signals are applied to drive actuators 56, 58, 60, 62, which cause the masses 20, 24 to oscillate along the x-axis and masses 22, 26 oscillate along the y-axis. With the constraints of link beams 54, the oscillations of these masses along their own drive axes are in phase to one another.

Figure 2:
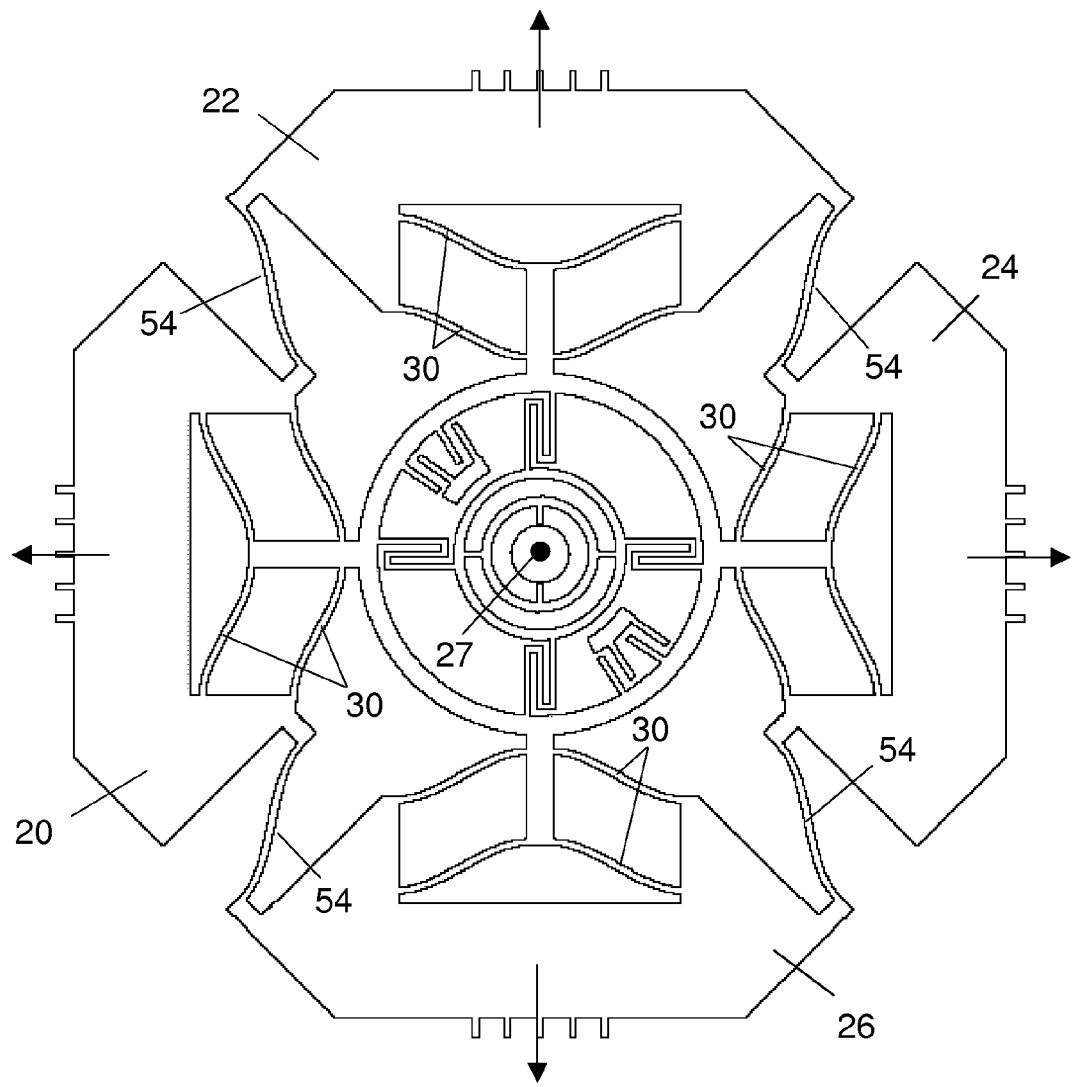
FIG. 2 is an operational view, illustrating the drive-mode oscillation of the embodiment of FIG. 1.

The mode shape of this drive-mode oscillation is shown in FIG. 2, wherein the arrows mark the directions of the movement of masses.

With symmetric design of masses and coupling springs as shown in FIG. 1, the proof masses can oscillate in drive-mode with exact same phase and equal amplitudes, which results in perfectly balanced drive momentum, i.e. zero total drive momentum. Hence, the drive-mode oscillation injects no energy or force into the substrate.

In addition, the ratio of drive amplitudes of adjacent masses in drive-mode can be adjusted by changing the orientation of the link beam to form unequal angles to the two masses. This may be desirable in rate sensor designs for some applications.

Since the rate sensor has a single oscillation of the masses that is excited as the drive-mode, a single drive control circuit is sufficient to achieve amplitude regulated drive-mode oscillation of all masses in the system. Hence, the required application-specific-integrated-circuit (ASIC) for this tri-axis rate sensor is much smaller and lower cost compared to three separate ASICs for three rate sensors.

In the presence of an angular rate, or rotation, about the x-axis, or an axis parallel to the x-axis, the Coriolis forces produced on masses 22, 26 cause the masses and the sense frame to rotate about the x-axis, or the rate input axis. That out-of-plane sense mode rotation, hence the sense rotation about the input axis along the x-axis, is monitored by the capacitors 82, 86.

In the presence of rotation about the y-axis, or an axis parallel to the y-axis, the Coriolis forces produced on masses 20, 24 cause the masses and the sense frame to rotate about the y-axis, or the rate input axis. That out-of-plane sense mode rotation, hence the sense rotation about the input axis along the y-axis, is monitored by the capacitors 80, 84.

In the presence of an angular rate about the z-axis, or an axis parallel to the z-axis, the Coriolis forces produced on masses 20, 22, 24, 26 cause the masses and the sense frame to rotate about the z-axis, or the rate input axis. That in-plane sense mode rotation, hence the sense rotation about the input axis along the z-axis, is detected by the capacitors 88.

Therefore, in presence of rotation about any one of those three input axes, i.e. the x-, y-, and z-axes, the Coriolis forces produced on part or all of the masses cause all masses together with the sense frame to oscillate in a sense mode which is the sense rotation about that rate input axis. And a capacitance sensor detects that sense mode oscillation to monitor the angular rate. Thus, this rate sensor, or a tri-axis gyroscope, has three mutually perpendicular rate input axes: the x-, y-, and z-axis.

In general, in presence of rotation about an arbitrary axis, the rotation vector can be decomposed into three rotation components along the three input axes. Thus, the rotation component along each input axis causes the sense frame and masses to rotate about that input axis independently of one another. And the sense rotations about all three input axes are monitored at the same time by the capacitors 80, 82, 84, 86, and 88. Thus, this tri-axis gyroscope measures all three components of the rotation vector along three mutually perpendicular input axes at the same time.

Since independent suspension and rotation members are utilized for drive and sense modes, these modes can be well decoupled so that undesired dynamic couplings between modes are minimized, and the resulting quadrature error and crosstalk are suppressed.

Figure 3:
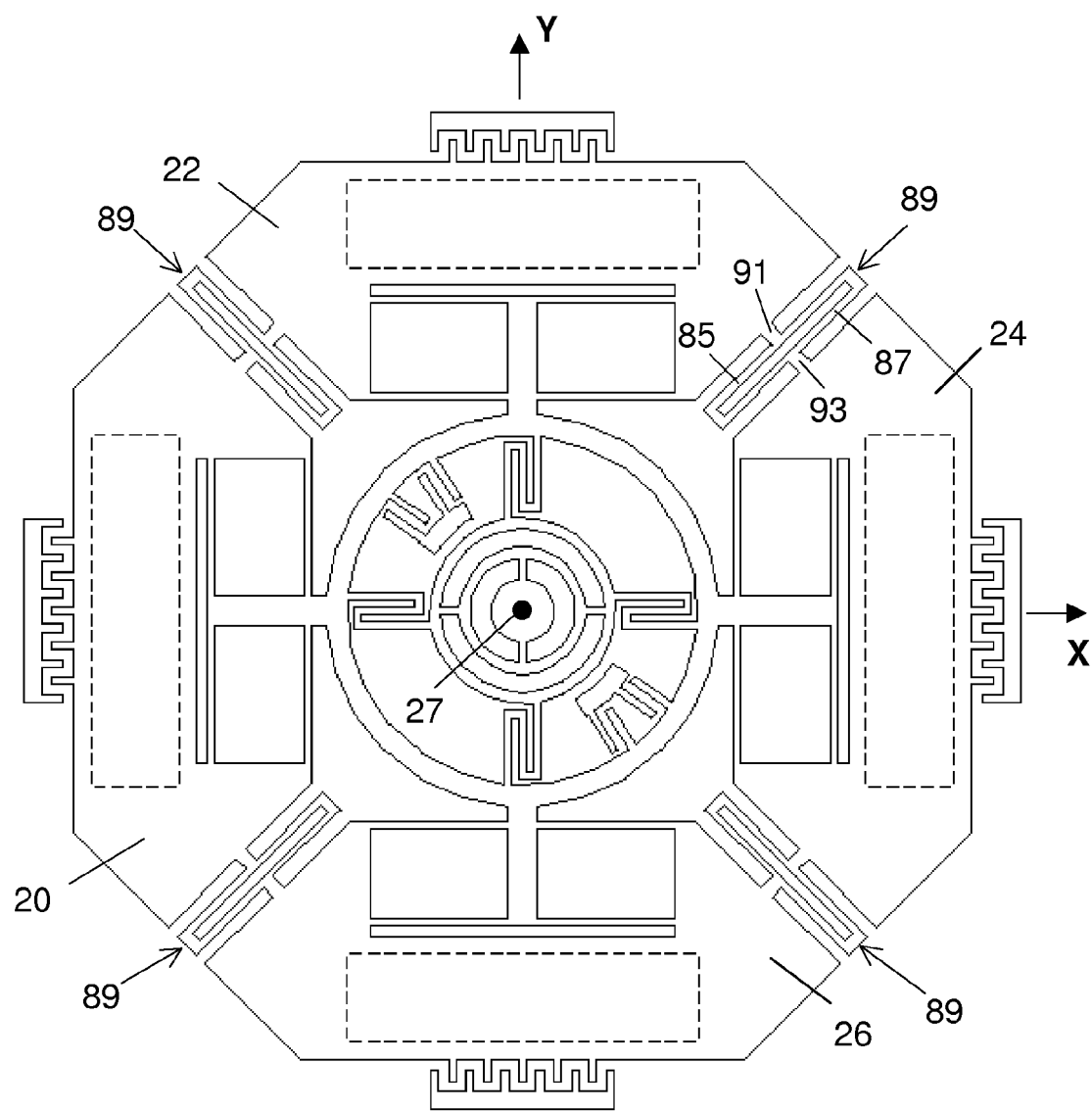
FIG. 3 is a top plan view of another embodiment of a tri-axis rate sensor according to the present invention.

FIG. 3 shows another embodiment of tri-axis rate sensor that is similar to the embodiment of FIG. 1, but utilizes a different design of coupling springs. This embodiment has box springs 89 for constraining adjacent ones of masses for oscillating in in-phase manner.

Each box spring consists of two parallel, relatively long and flexible beams 85, 87, with ends connected to each other by two relatively short and stiff arms to form a rectangular shape. The box spring is oriented with its longitudinal axis, which is parallel to its long beams, forming approximately equal angles to the two drives axes of the two adjacent masses. It connects the adjacent edges of two masses by two blocks, or tabs 91, 93, which are affixed at the middle of beams 85, 87 respectively.

The box spring is generally relatively stiff in its longitudinal direction, but relatively compliant in its lateral direction that is perpendicular to the longitudinal direction and in the plane of the masses. Similar to the link beam of the embodiment of FIG. 1, the box spring constrains two adjacent masses to which it connects for relative movement parallel to its lateral direction.

It can be seen, in the embodiment of FIG. 1, the proof masses are disposed outside of the sense frame, and the suspension and rotation members of the sense frame are located in the center region within the sense frame. This structural arrangement requires relatively small sizes of the sense frame and the gimbals, which are the passive parts that do not contribute in producing Coriolis force. In principle, the smaller size of passive parts results in smaller moment of inertia of sense modes that improves the detection efficiency of the gyroscope.

In addition, the moving parts of the whole device are suspended and supported by a single anchor located at the center of the device. This makes the gyroscope insensitive to the external stress from packaging.

Figure 4:
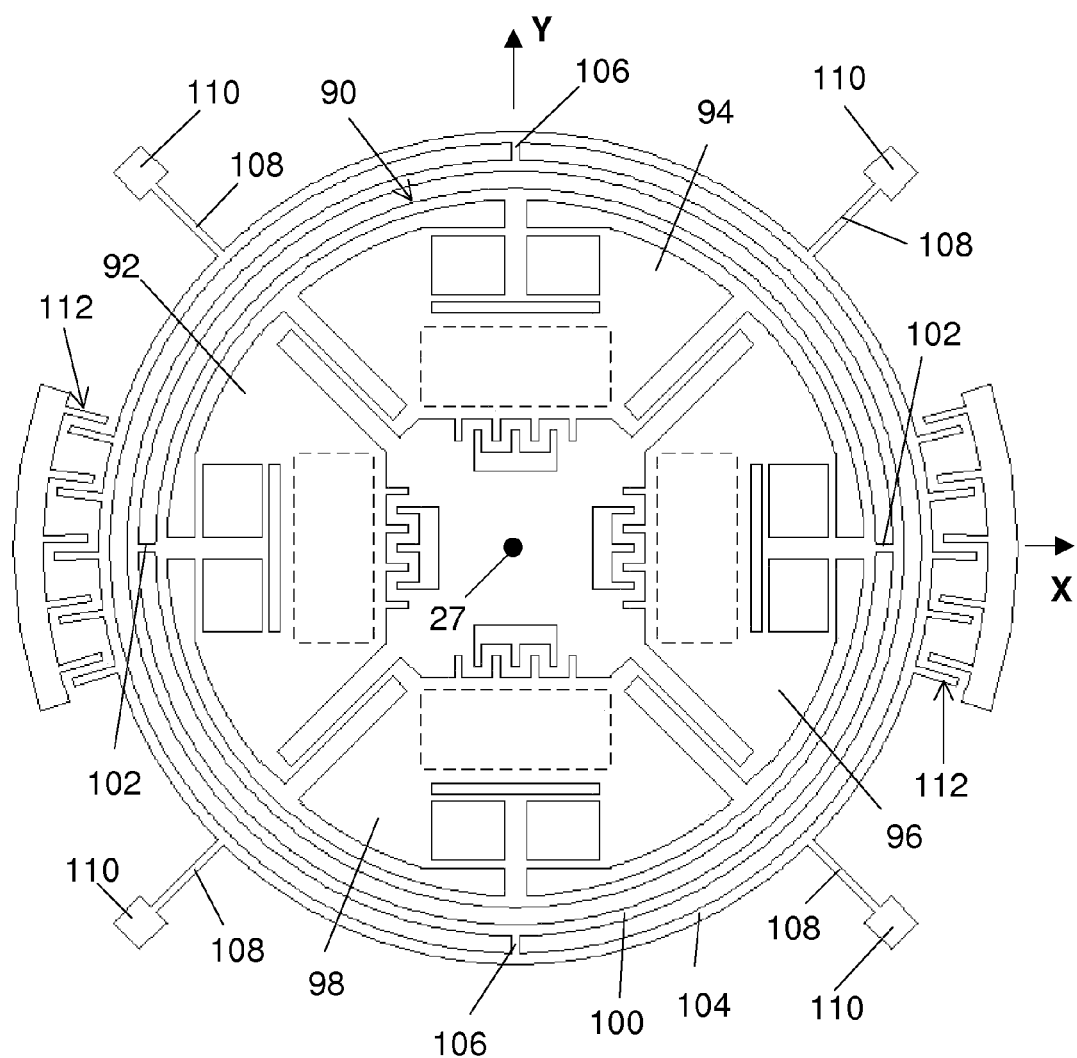
FIG. 4 is a top plan view of another embodiment of a tri-axis rate sensor according to the present invention.

FIG. 4 illustrates another embodiment of a tri-axis rate sensor, which is similar to the embodiment of FIG. 1 in mass mounting and coupling design, as well as operation principles, but has different structural arrangement such that the suspension structure of the sense frame is disposed outside the frame and surrounding it.

In this embodiment, proof masses 92, 94, 96, 98 are disposed inside sense frame 90. The sense frame is mounted to a gimbal 100 that surrounds it by a pair of torsion beams 102, which extend along the x-axis and permit the sense frame to rotate relative to gimbal 100 about the x-axis. Gimbal 100 is further mounted to another gimbal 104 that surrounds it by another pair of torsion beams 106, which extend along the y-axis and permit gimbal 100 to rotate relative to gimbal 104 about the y-axis. Gimbal 104 is suspended by flexures 108, which extend in radial directions and constrain gimbal 104 for rotation about the z-axis. Flexures 108 are mounted to anchor posts 110 that are affixed to a substrate (not shown).

Although this embodiment in general has bigger inactive parts than that of the embodiment of FIG. 1, which may result in lower detection efficiency of the gyroscope, it has a number of advantages over that embodiment.

First, it provides generally stronger support in the z-axis direction for the sense frame and masses by placing the suspension members and anchors outside of the masses.

Second, it allows one to mount the parallel plate capacitors 112 on gimbal 104 for detecting the rotation about the z-axis, as shown in FIG. 4. Since gimbal 104 has a relatively large radius to its rotation center 27 and is free from out-of-plane movement in operation, this design increases the rate sensitivity of the gyroscope about the z-axis and further reduces the crosstalk from the angular rate about the other two input axes.

Figure 5:
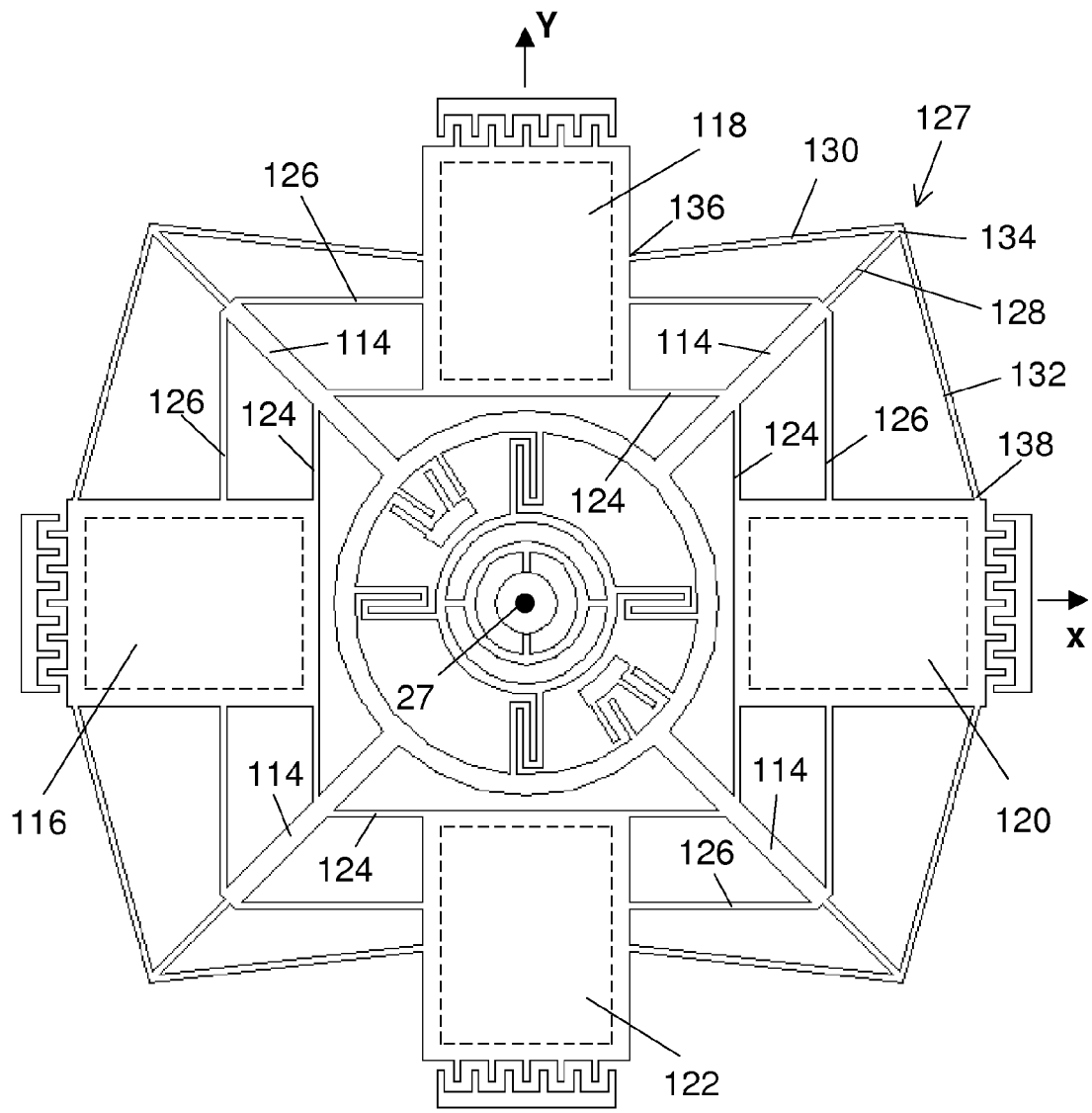
FIG. 5 is a top plan view of another embodiment of a tri-axis rate sensor according to the present invention.

The embodiment illustrated in FIG. 5 is generally similar to the embodiment of FIG. 1, but utilizes a different mechanism to couple the proof masses. Unlike the embodiment of FIG. 1, the sense frame of this embodiment has stems 114 extended diagonally that form approximately 45-degree angles to the x- and y-axes. Proof masses 116, 118, 120, 122 are mounted to these stems by flexures 124, 126 disposed outside of the masses.

The coupling structures in this embodiment are generally identical to one another, with each one disposed between two adjacent masses. A coupling structure 127, which is located between mass 118 and 120, consists of a pair of tilt beams 130, 132 and a supporting beam 128.

The tilt beams join together at one end forming a joint 134, with the other ends connected respectively to the masses forming joints 136, 138. Beam 130 extends from joint 134 in a direction tilted with a predetermined angle from that perpendicular to the drive axis of mass 118. Similarly, beam 132 extends from joint 134 in a direction tilted from the direction perpendicular to the drive axis of mass 120.

In addition, the two tilt beams are tilted in opposite directions, i.e. beam 130 is tilted toward center 27 with respect to joint 134, and beam 132 is tilted away from the center. The supporting beam 128 extends along the axial direction of stem 114, with one end affixed to the end of the stem and the other end connected to joint 134.

In operation, when mass 120 moves toward center 27 along its drive axes in the x-axis, beam 132 pushes joint 134 to move away from the mass due to its tilted manner. Beam 128 constrains the movement of joint 134 to compress beam 130. Due to the tilted manner of beam 130, that compression causes mass 118 to move toward center 27 along its drive axis in the y-axis.

Similarly, when mass 120 moves away from the center, joint 134 is pulled by beam 132 to move toward the mass, and beam 128 constrains this movement to pull beam 130 that causes mass 118 to move away from the center along its drive axis. Hence, the oscillations of masses 118, 120 along their own drive axes are coupled in in-phase manner.

Figure 6:
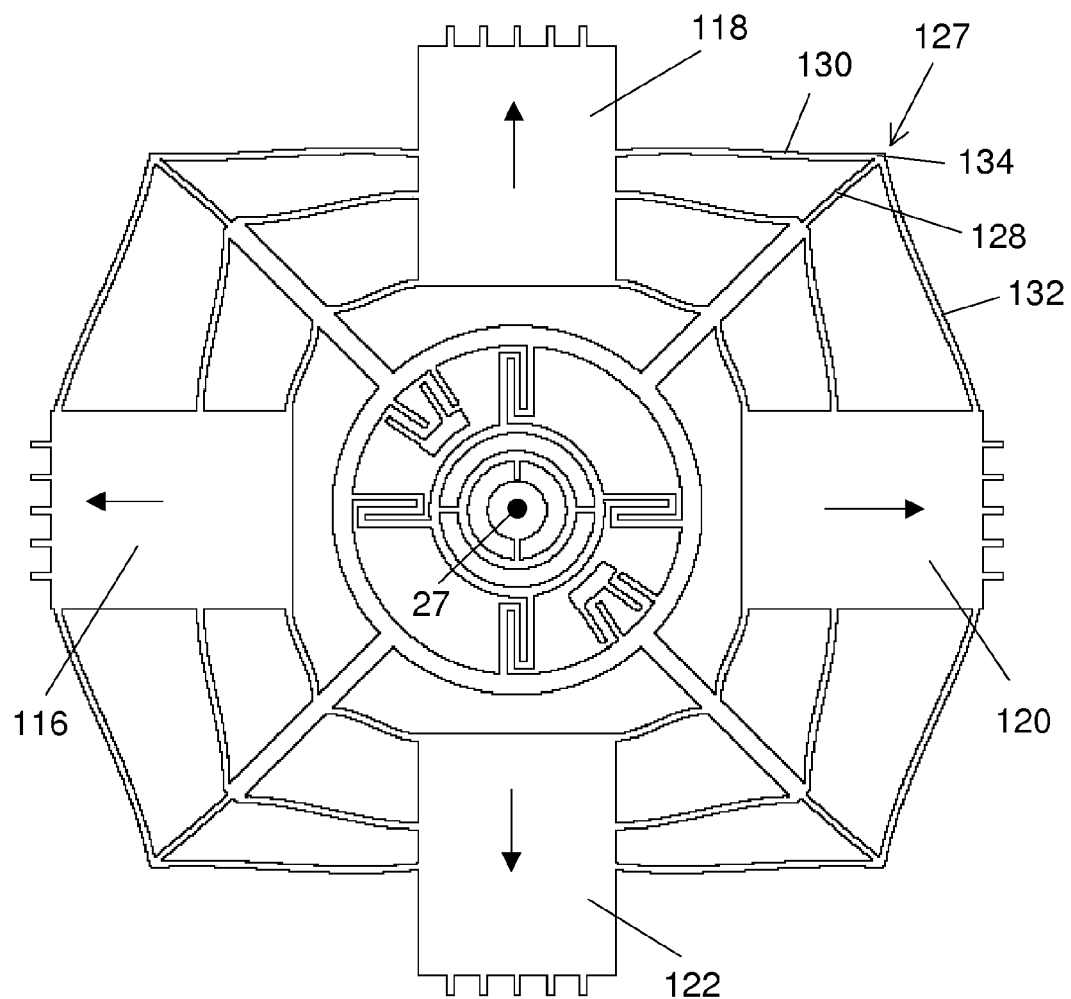
FIG. 6 is an operational view, illustrating the drive-mode oscillation of the embodiment of FIG. 5.

This coupling effect is also true for other adjacent masses since they are coupled in the same manner. Therefore, all masses are oscillating along their own drive axes in in-phase manner with respect to one another in drive-mode. The mode shape of the drive-mode oscillation is shown in FIG. 6, wherein the arrows mark the directions of the movement of masses. This mode is the lowest vibration mode of the proof masses.

The use of tilt beams in this coupling design achieves one-to-one correspondence between the movement of the masses along their drive axes and the movement of the joint of the tilt beams that is supported by the supporting beam. If these beams were not tilted, such correspondence would not be valid and the coupling effect could not be realized. For an example, if beam 132 was not tilted, and extended perpendicular to the x-axis instead, when mass 120 moves along its drive axis in both directions, i.e. toward or away from center 27, joint 134 would always be pulled to move toward the mass, which leads to no effective constraint between the directions of the movements of the two masses along their drive axes.

Therefore, it is important that in operation the drive amplitudes of the masses should be controlled within a certain limit so that the tilt beams do not reach or exceed their equivalent un-tilted positions, i.e. the beams are approximately perpendicular to the drive axes. Beyond that limit, the one-to-one correspondence described above is not valid and the coupling is not effective anymore.

The ratio of amplitudes of adjacent masses in drive-mode can be adjusted by changing the ratio of tilt angles of the two tilt beams, as well as the angles of the supporting beam relative to the drive axes of the two masses.

In this embodiment, it is essential to keep the two tilt beams tilted in opposite directions. Only under this arrangement, the oscillations of adjacent ones of the masses are in phase, which results in Coriolis torques produced by all of the masses caused by rotation about the z-axis are in the same direction.

Figure 7:
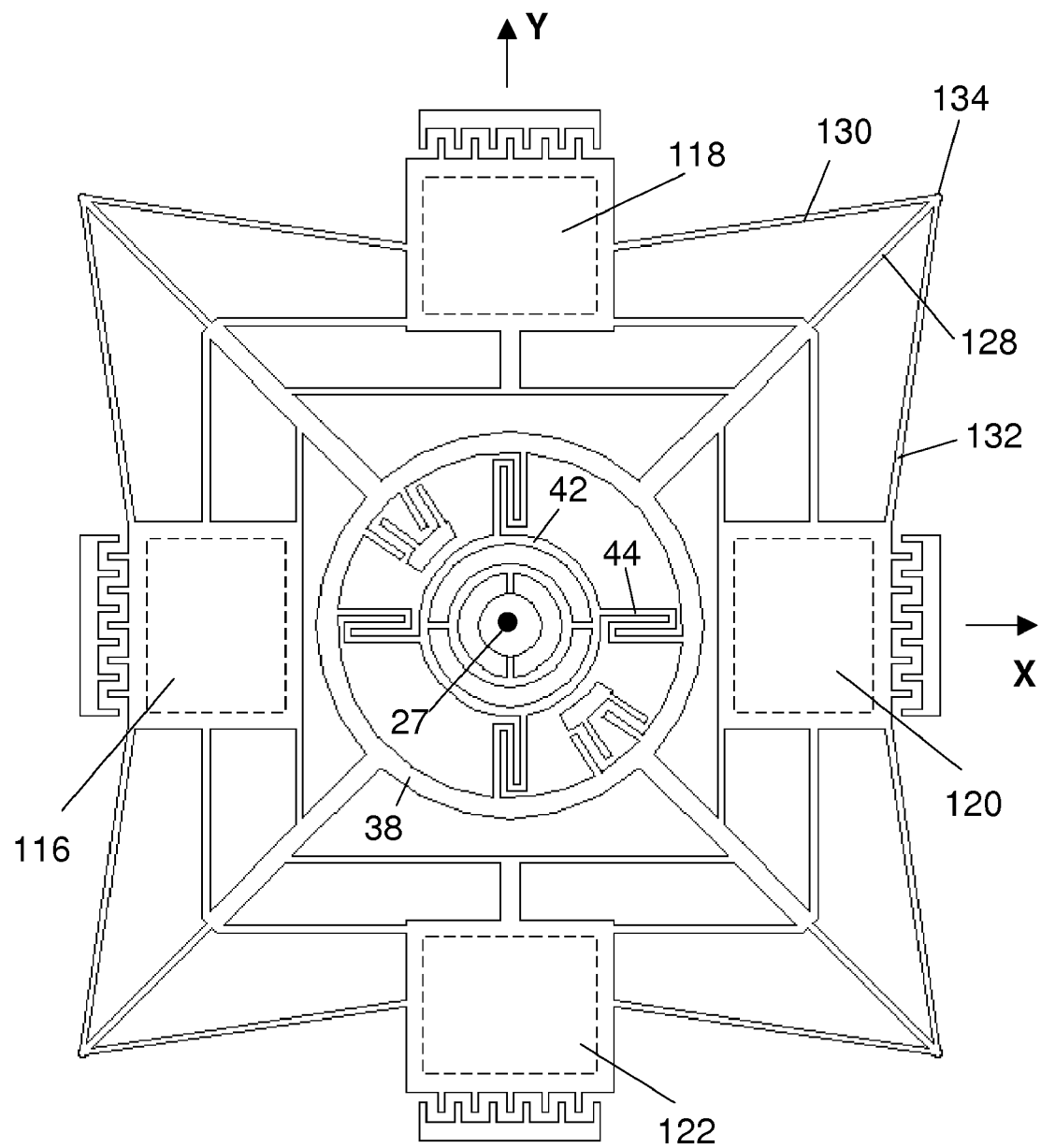
FIG. 7 is a top plan view of another embodiment of a tri-axis rate sensor according to the present invention.

However, this requirement is not absolutely necessary for a tri-axis rate sensor. FIG. 7 shows another embodiment that has the tilt beams tilted in the same direction. Because it is very similar to the embodiment of FIG. 5, the same reference numbers are designated. Beam 132 now is tilted in the opposite direction compared to that in the embodiment of FIG. 5.

Figure 8:
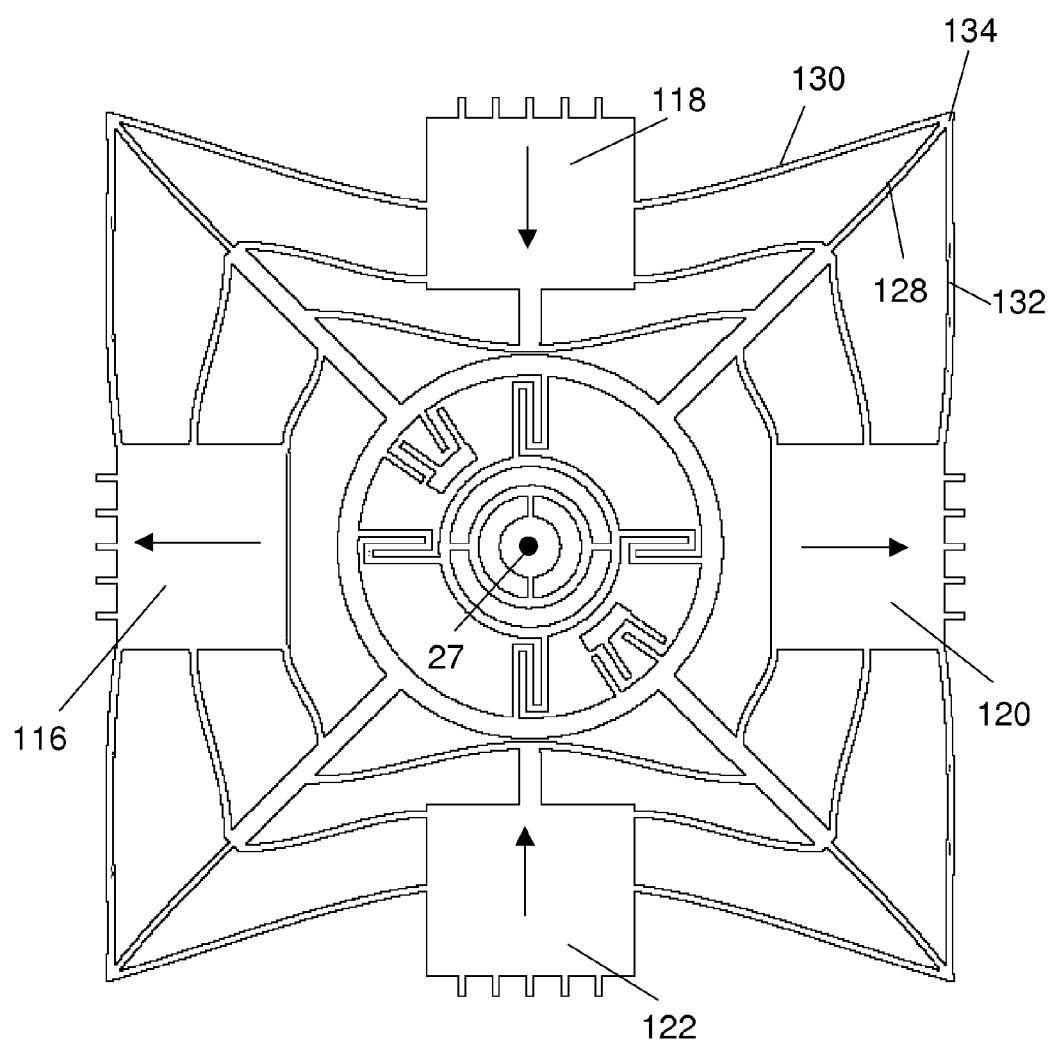
FIG. 8 is an operational view, illustrating the drive-mode oscillation of the embodiment of FIG. 7.

This tilt configuration of the coupling structure results in the drive-mode oscillations of adjacent ones of the masses in anti-phase manner, i.e. when one mass moves toward center 27, its adjacent masses move away from the center at the same time, as illustrated in FIG. 8.

This anti-phase oscillation does not affect the measurement of rotation about the x-, and y-axes. However, for rotation about the z-axis, this causes the Coriolis torque produced by masses 116, 120 in a direction opposite to that produced by masses 118, 122. Thus, these torques tend to cancel each other and cause little or no rotation of the sense frame about the z-axis.

Therefore, in order to make a tri-axis gyroscope utilizing this coupling structure, the net Coriolis torque caused by rotation about the z-axis should not be zero, and needs to be maximized as possible. This can be done by a number of ways such as utilizing unequal drive amplitudes of masses, or uneven masses in different axes, etc.

An alternative approach as illustrated in FIG. 7 is to move masses 118, 122 lying in the y-axis farther away from center 27 than masses 116, 120 lying along the x-axis. By this way, even if the masses and drive amplitudes are identical for all proof masses, which results in equal Coriolis force produced by each mass caused by rotation about the z-axis, the torque produced by masses 118, 122 is larger than that by masses 116, 120. Thus, this approach makes the gyroscope still effective in measuring the angular rate about the z-axis. Although, it is less efficient than the embodiment of FIG. 5 in detecting the angular rate about the z-axis, it maybe suitable for some specific applications that require discriminated detecting sensitivities along different input axes.

Figure 9:
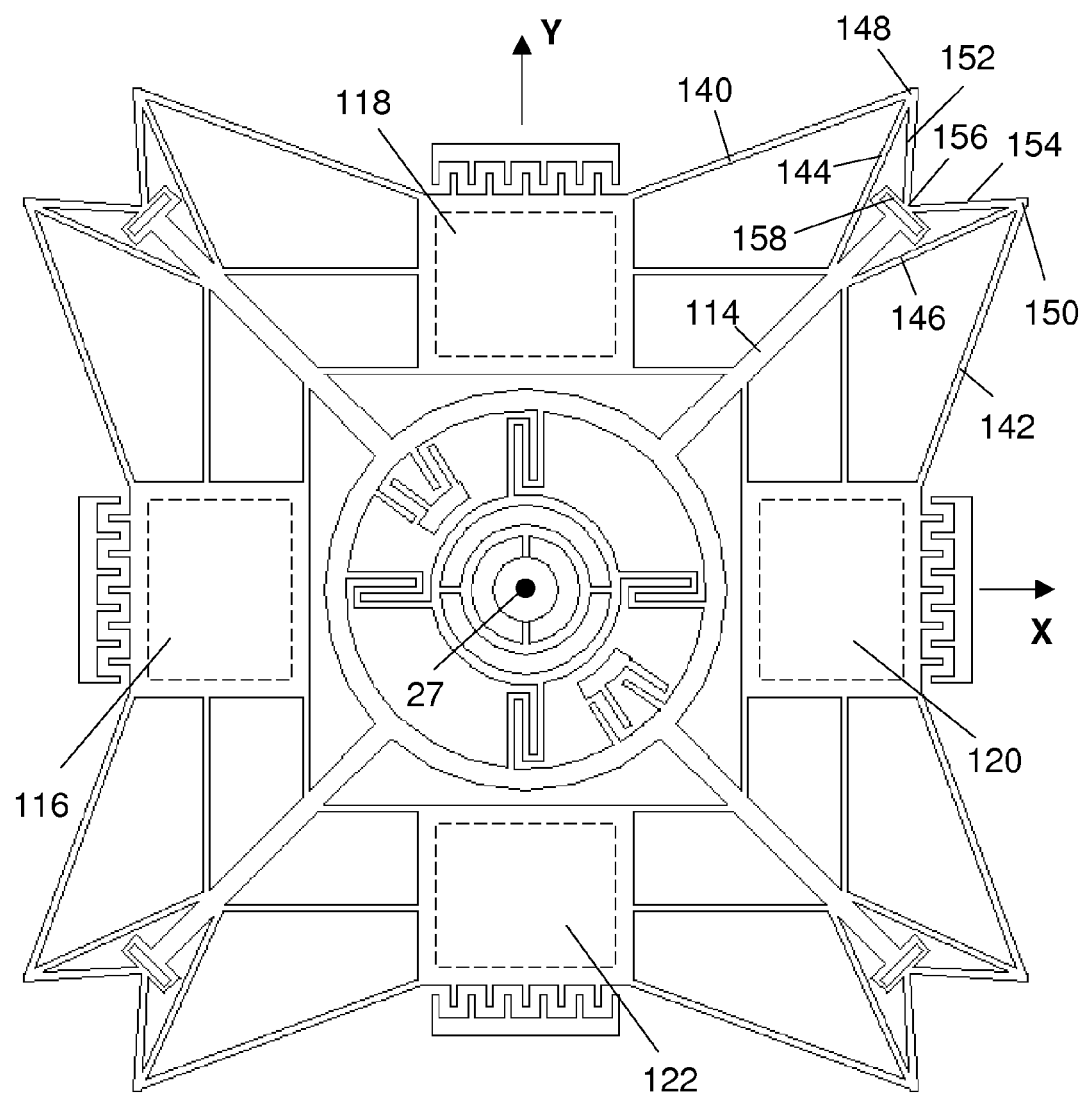
FIG. 9 is a top plan view of another embodiment of a tri-axis rate sensor according to the present invention.

FIG. 9 shows another embodiment similar to the embodiment of FIG. 5, but utilizes a different design of mass coupling structures. Each coupling structure in this embodiment consists of three pairs of flexible beams. The first pair of beams, or tilt beams 140, 142, is similar to beams 130, 132 of the embodiment of FIG. 7, with one end connected to the two masses and tilted from directions perpendicular to the drive axes. But unlike beams 130, 132, the other ends of these two beams do not join together.

The second pair of beams, or supporting beams 144, 146, is affixed to stem 114 at one end, with the other end extended to intersect with the tilt beams forming joints 148, 150 respectively. The third pair of beams, or transfer beams 152, 154, is located between beam 144 and 146, with one end joined together forming a joint 156 and the other end joined to the joints 148, 150 respectively. Joint 156 is further mounted to the middle point of a lateral beam 158 that is disposed perpendicular to the axial direction of the stem with its two ends mounted on the stem.

The two tilt beams in each coupling structure in this embodiment are tilted in the same direction respect to the center, i.e. both are tilted toward the center as illustrated in this embodiment. But unlike that in the embodiment of FIG. 7, it constrains adjacent masses to oscillate in in-phase manner.

Figure 10:
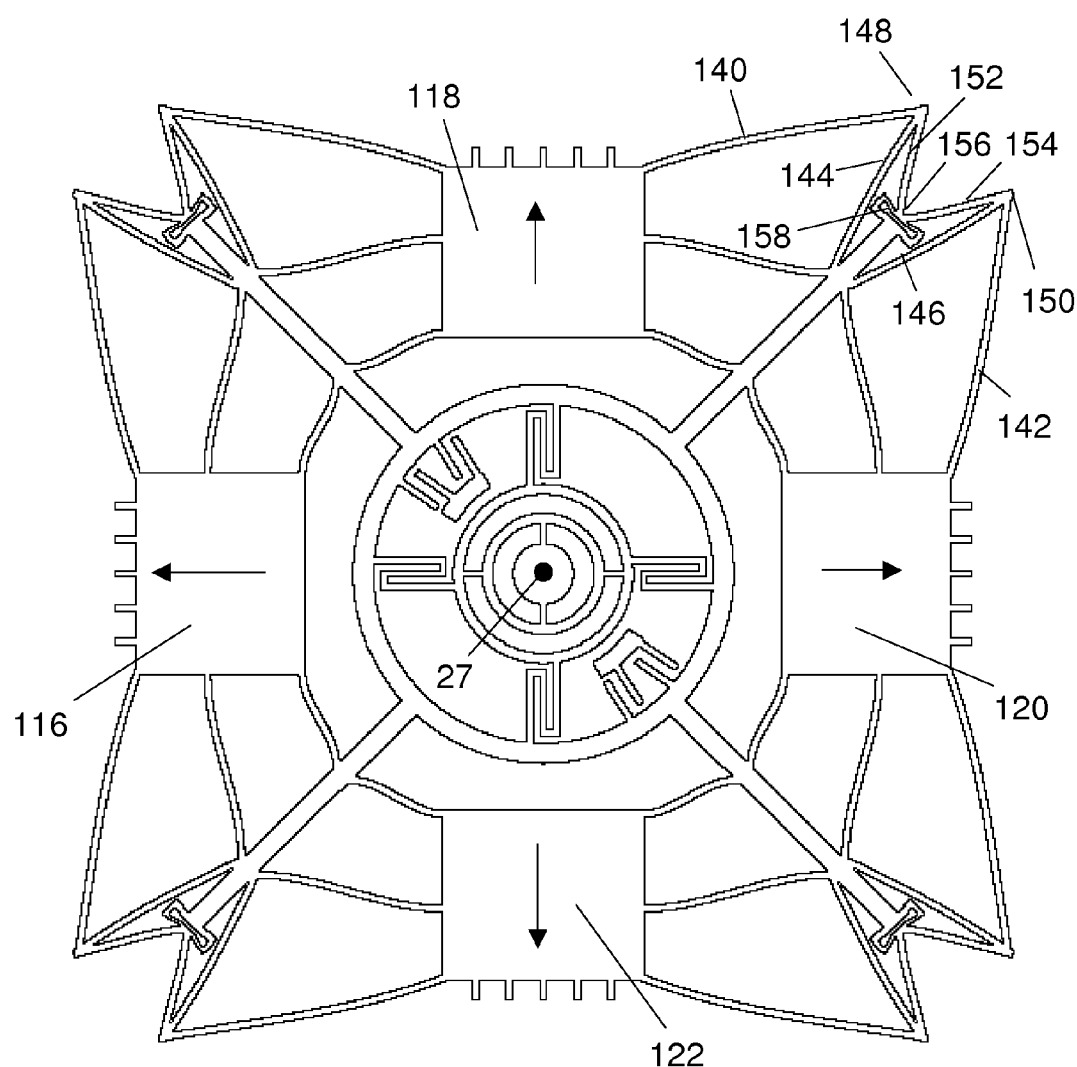
FIG. 10 is an operational view, illustrating the drive-mode oscillation of the embodiment of FIG. 9.

For an example, when mass 120 moves along the x-axis and away from the center of device, tilt beam 142 pushes joint 150 to move in a direction away from the mass. This movement is guided by supporting beam 146 and transferred to joint 156 by transfer beam 154. In addition, lateral beam 158 constrains joint 156 for movement only in the direction perpendicular to the beam. As a result, joint 156 moves toward the center of device in the radial direction. This movement is transferred to joint 148 by transfer beam 152, and causes joint 148 to move away from mass 118 in a direction perpendicular to beam 144. This movement of joint 148 pulls the tilt beam 140 and causes mass 118 to move in the direction away from the center along its drive axis in the y-axis. Thus the two adjacent masses oscillate in in-phase manner along their drive axes. The coupled drive-mode oscillation of this embodiment is illustrated in FIG. 10, wherein the arrows mark the directions of the movement of masses The coupling structure in this embodiment is more complex than those in other embodiments; however, it is found to be more effective for coupling two adjacent masses with drive axes forming an angle that is larger than 90 and close to 180 degrees. To ensure this coupling design working effectively, all beams in the coupling structure should be properly designed so that they do not buckle in normal operation in drive-mode.

Figure 11:
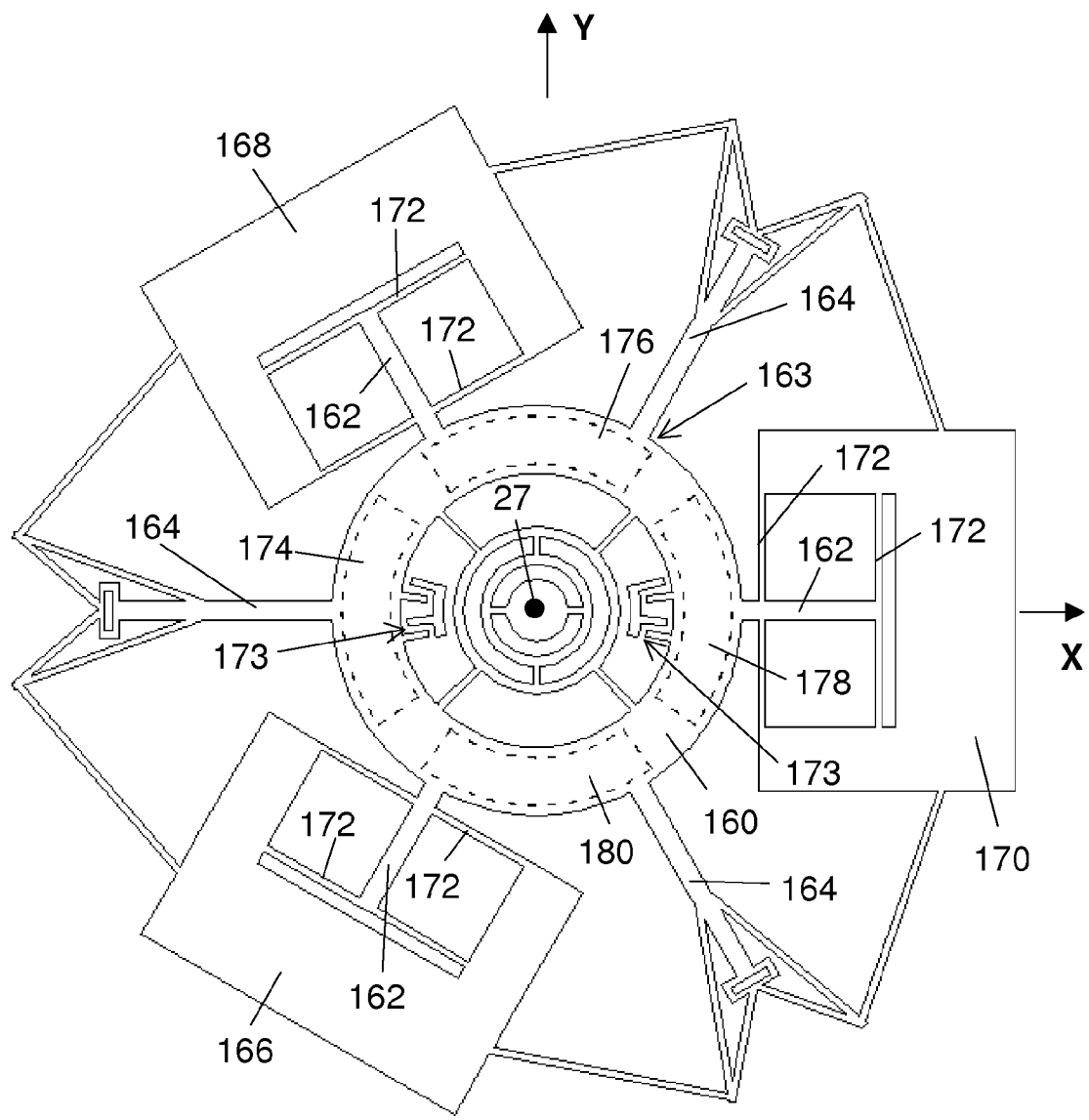
FIG. 11 is a top plan view of another embodiment of a tri-axis rate sensor according to the present invention.

FIG. 11 illustrates another embodiment of a tri-axis gyroscope that is similar to the embodiment of FIG. 9, but consists only three proof masses. Masses 166, 168, 170 are generally evenly distributed in x, y plane around center 27 and surround a ring 160 of sense frame 163. Mass 170 has its drive axis in the x-axis, and masses 166, 168 are symmetrically disposed about the x-axis with drive axes intersecting at center 27. The masses are mounted by flexures 172 to stems 162 which are mounted to ring 160. Similar to FIG. 1, stems 162 extend into the inner sides of the masses.

The design of coupling structures between adjacent ones of the masses is similar to that in the embodiment of FIG. 9. These coupling structures are mounted to stems 164 which are affixed to ring 160. This coupling design leads to in-phase oscillations of the three masses in drive-mode. The design of suspension structure of sense frame 163 is also similar to that in embodiment of FIG. 9, which makes the sense frame capable to rotate independently about the three input axes, i.e. the x-, y-, and z-axes.

In operation, the masses are driven by actuators such as comb drives (not shown) to oscillate in drive-mode in in-phase manner. In presence of rotation about the z-axis, Coriolis forces induced on the masses produce torques in the same direction that cause the sense mode rotation of masses and the sense frame about the z-axis. In presence of rotation about the x-axis, masses 166, 168 by their velocity components along the y-axis produce Coriolis forces that cause the sense mode rotation about the x-axis. In presence of rotation about the y-axis, mass 170, and masses 166, 168 by their velocity components along the x-axis produce Coriolis force that cause the sense mode rotation about the y-axis.

Similar to the other embodiments disclosed, the Coriolis torque caused in-plane sense mode rotation of the masses with the sense frame is monitored by parallel plate capacitors 173 mounted on ring 160 of the sense frame, and out-of-plane sense mode rotation can be generally detected by electrodes beneath the masses. However, with odd number of proof masses, it may be challenging in designing such electrodes beneath the masses. This embodiment provides an alternative way that is to dispose the electrodes 174, 176, 178, 180 beneath ring 160 and to form capacitors with the ring. To increase the capacitances of those capacitors, ring 160 is now wider than those in the other embodiments.

Some applications require measurement of rotation only about one or two axes, hence a single-axis or a dual-axis rate sensor, instead of a tri-axis one maybe more desirable in these applications. A unique advantage of the present invention is that every tri-axis rate sensor disclosed above can be converted into: (1) a single-axis rate sensor with input axis chosen from any one of three mutually perpendicular axes, i.e. the x-, y-, and z-axes, (2) a dual-axis gyroscope with input axes chosen from any two of those three axes, by only modifying the design of suspension structure of the sense frame, to permit it to rotate only about each pre-selected input axis.

Figure 12:
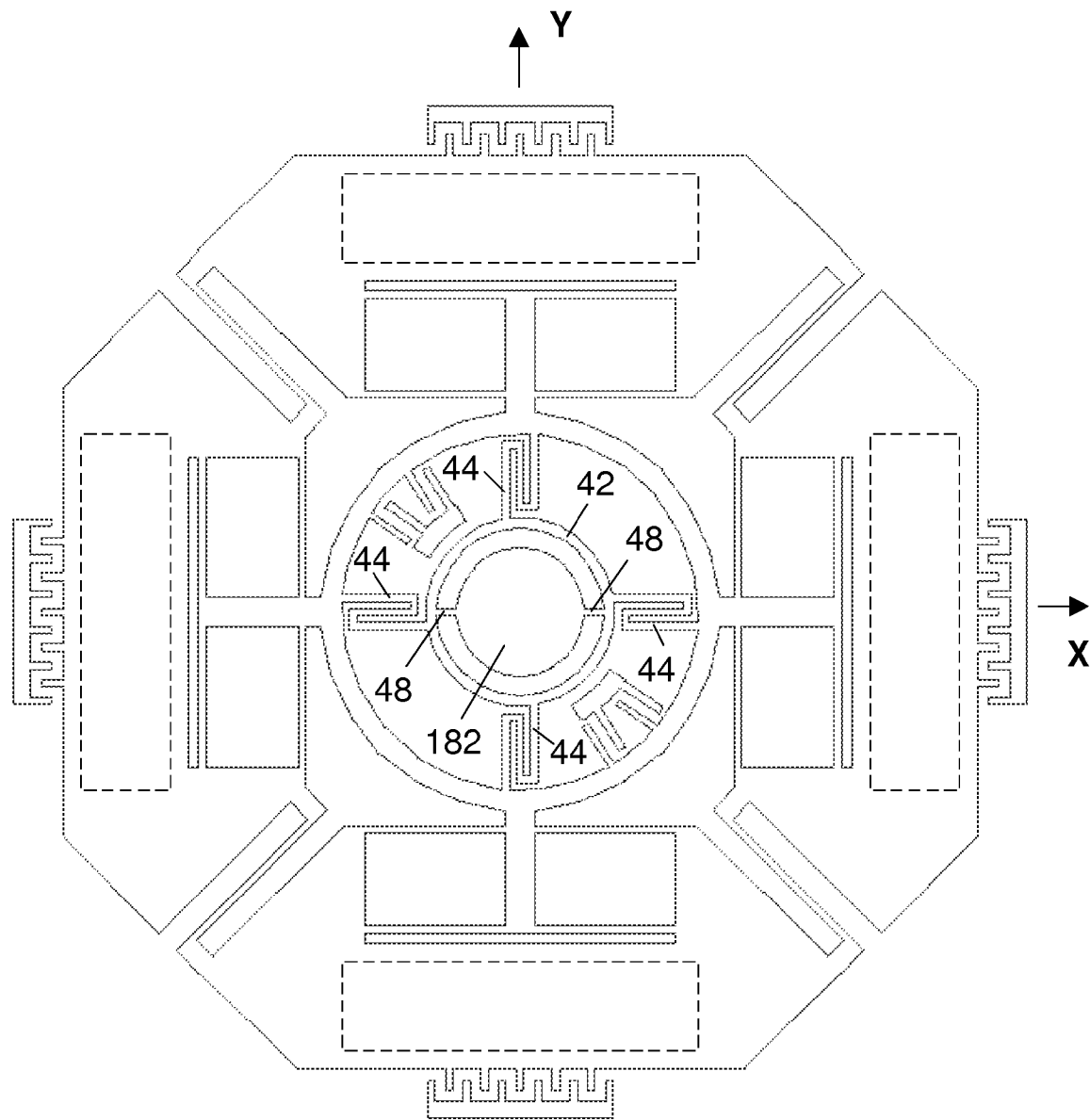
FIG. 12 is a top plan view of an embodiment of a dual-axis rate sensor incorporating the invention.

For example, the embodiment of a tri-axis gyroscope as illustrated in FIG. 1 becomes a dual-axis rate sensor with two input axes along the x- and z-axes, when gimbal 46 and torsion beams 52 are removed and torsion beams 48 are mounted directly to a new anchor post 182, as illustrated in FIG. 12. Under this design, the sense frame and the proof masses can only rotate in sense modes about the pre-selected input axes: the x-, and z-axes.

Figure 13:
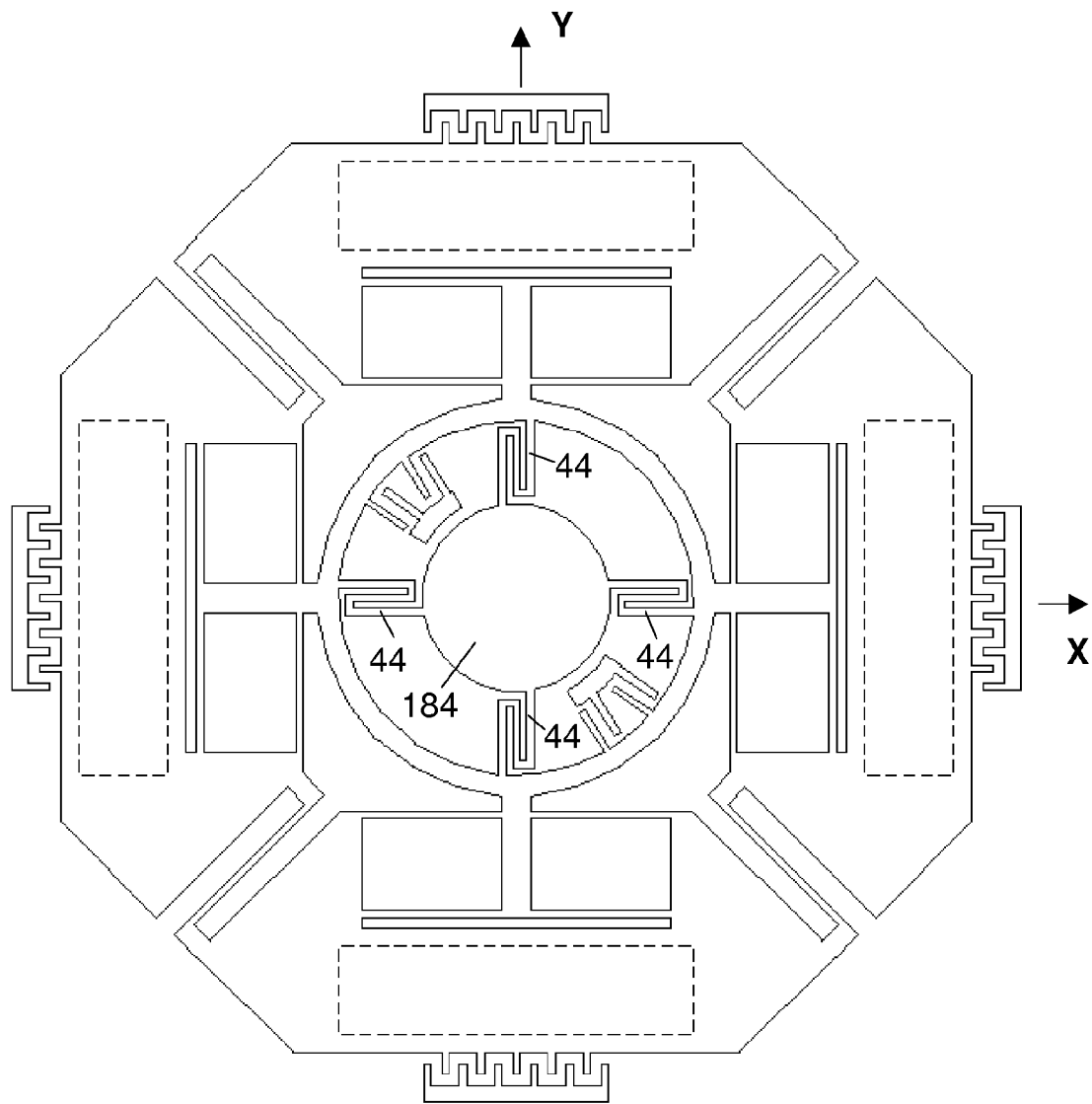
FIG. 13 is a top plan view of an embodiment of a single-axis rate sensor incorporating the invention.

Furthermore, it becomes a z-axis gyroscope, if gimbal 42 and torsion beams 48 are further removed and flexures 44 are affixed directly to a new anchor post 184, as shown in FIG. 13.

Figure 14:
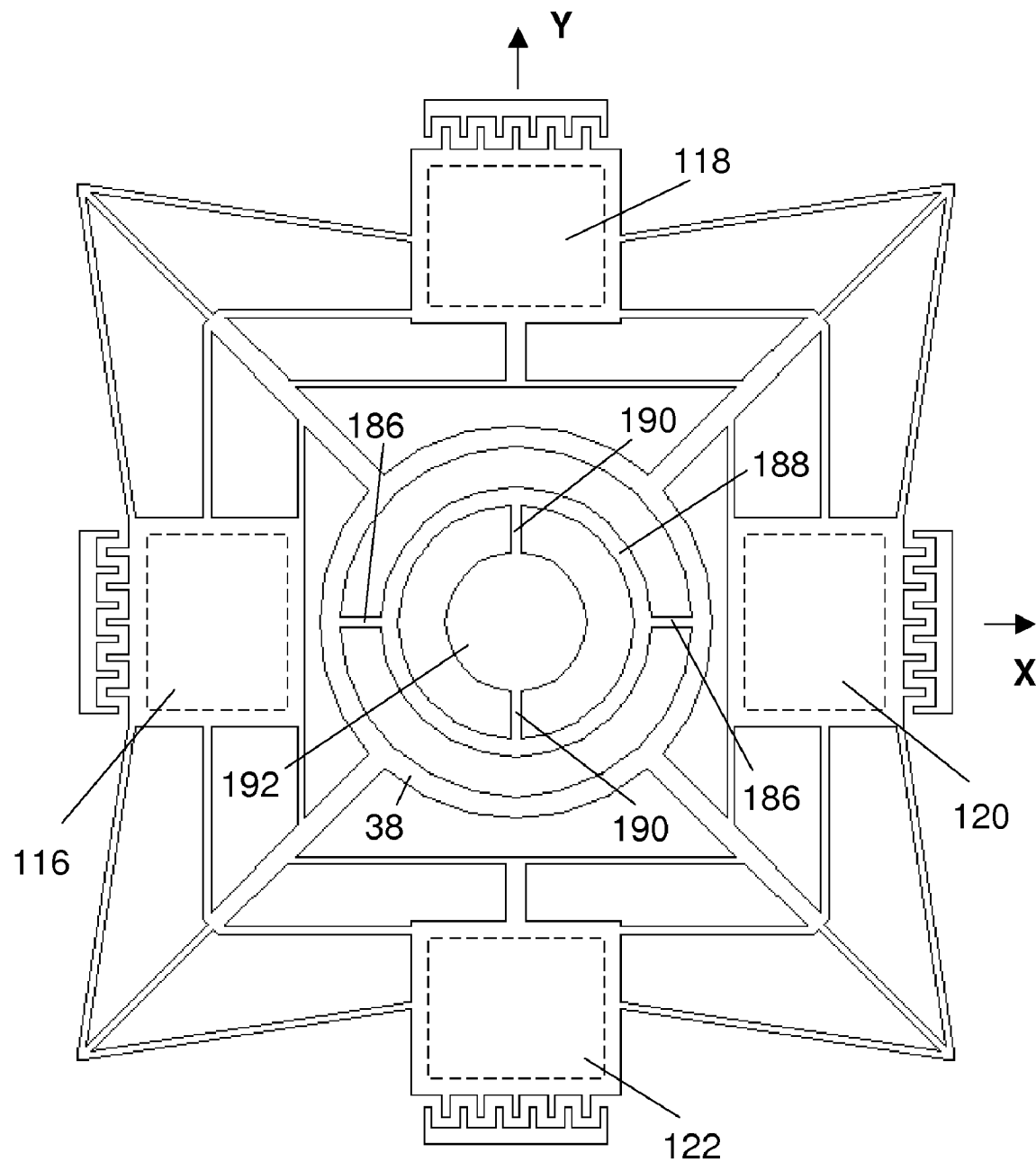
FIG. 14 is a top plan view of another embodiment of a dual-axis rate sensor incorporating the invention.
Figure 15:
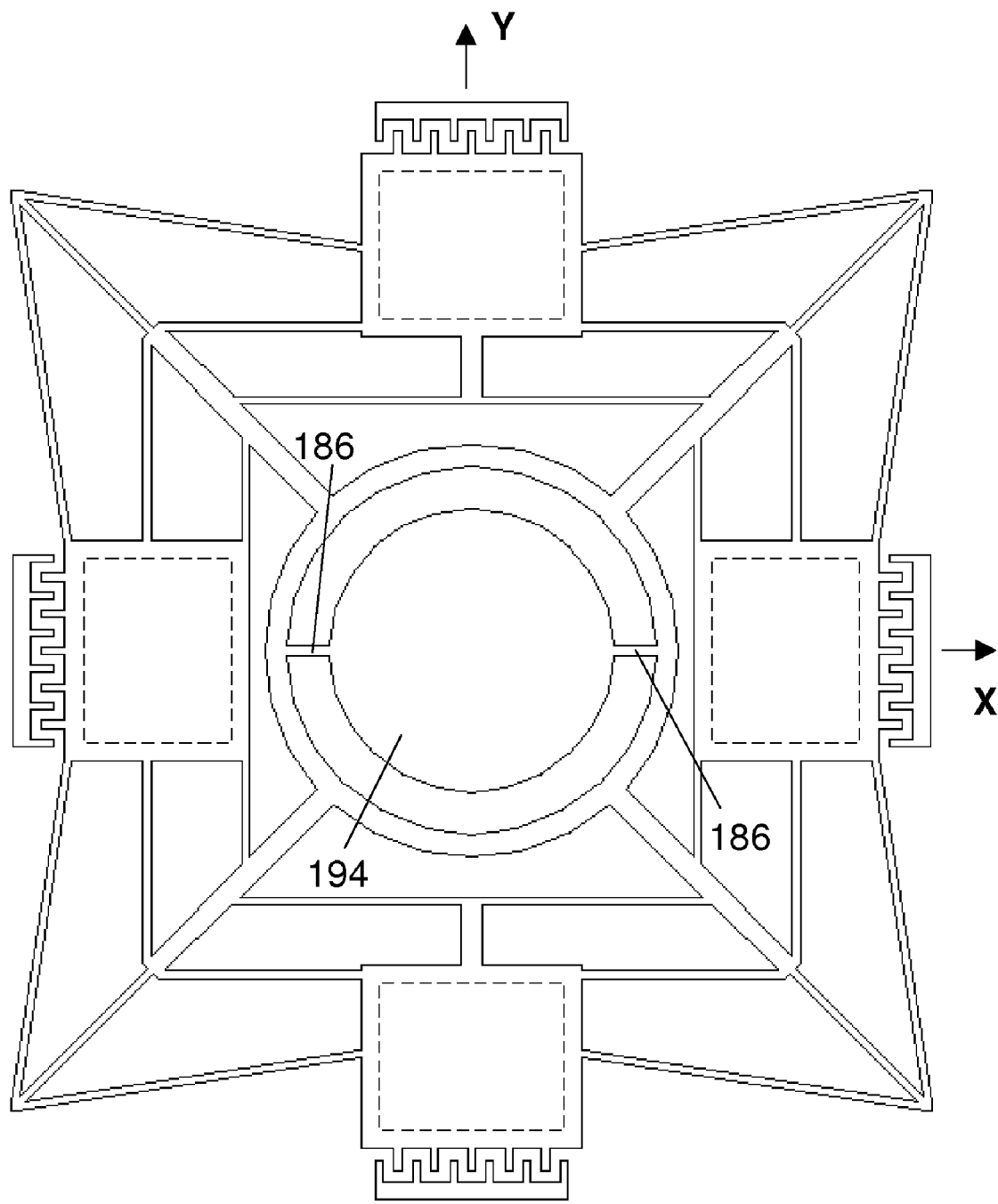
FIG. 15 is a top plan view of another embodiment of a single-axis rate sensor incorporating the invention.

Similarly, the embodiment of FIG. 7 can be converted into a dual-axis gyroscope with input axes along the x- and y-axes, if flexures 44 and gimbal 42 are removed, and ring 38 is mounted to a gimbal 188 by torsion beams 186 that extend along the x-axis, and gimbal 188 is further mounted to an anchor post 192 by torsion beams 190 that extend along the y-axis, as illustrated in FIG. 14. Under this design, the sense frame with the proof masses can only rotate in sense modes about the pre-selected input axes: the x- and y-axes. And it can be further converted into an x-axis gyroscope by connecting torsion beams 186 directly to an anchor post 194, as shown in FIG. 15.

The rate sensors according the present invention can be made from materials such as single-crystal silicon, polycrystalline silicon, metal, or other conductive materials, on a substrate such as silicon, glass, or other materials, by suitable MEMS process such as deep-reactive-ion-etching. And the sensors may be operated in atmosphere ambient or in vacuum housing for better performances.

As reader can see, multiple embodiments are described to make a rate sensor that is capable of measuring the rotation about three mutually perpendicular input axes, which enables a single rate sensor to sufficiently sense a rotation about an arbitrary axis.

The rate sensor utilizes coupled or linked multiple proof masses, which results in a single drive-mode oscillation along multi-directional drive axes, and a single sense mode for each rate input axis.

The single drive-mode oscillation of the masses is achieved by coupling adjacent masses, which are two masses oscillating in same plane but along different drive axes that are not collinear or parallel to each other. Therefore, the scope of the coupling is substantially different from those couplings of prior arts that are used to couple two masses to oscillate in anti-phase linear motion with drive axes collinear or parallel to each other.

Both in-phase and anti-phase couplings between adjacent masses can be achieved according to the present invention, and each can be used to make a tri-axis gyroscope.

Two types of coupling structures are disclosed in the embodiments above: 1) floating coupling structure: link beams or springs are affixed to the two adjacent masses only, 2) anchored coupling structure: at least one coupling member of each coupling structure is mounted on the sense frame, which is stationary in drive-mode.

Each mass in tri-axis rate sensors is used to sense the rotation about two mutually perpendicular input axes that are perpendicular to the drive axis of the mass. That maximizes the detecting efficiency of each mass, while most sensors of prior arts can only sense rotation about one axis by each mass.

Although the embodiments disclosed only include rate sensors with three, and four proof masses, the number of proof masses for the tri-axis rate sensor is certainly not limited to these. In fact, the minimum requirement for proof masses in a tri-axis gyroscope according to the present invention is two masses with driving axes forming an angle larger than 0 and less than 180 degrees, i.e. the drive axes of the two masses are not collinear or parallel to each other. Since each mass can sense rotation about two input axes that are perpendicular to its drive axis, i.e. one axis in the plane with the drive axes and the other perpendicular to the plane, that requirement ensures that the two in-plane input axes of the two masses are not collinear or parallel to each other. Hence, a sense having two such masses can sense rate in all three input axes: two in the plane and one perpendicular to the plane.

For an example, the embodiment of FIG. 11 will still function as a tri-axis gyroscope, if one mass, say mass 166, is removed from the device and leave only two masses 168, 170 and the coupling structure between them, although the drive momentums of the masses are no longer balanced in drive-mode.

It is apparent from the foregoing that a new and improved angular rate sensor has been provided. While only presently preferred embodiments have been described in detail, as will be apparent to those familiar with the art, certain changes and modifications can be made without departing from the scope of the invention as defined by the following claims.

The invention claimed is:

1. An angular rate sensor for detecting rotation about first, second and third mutually perpendicular input axes, comprising a substrate, a sense frame disposed in a plane formed by the first and second input axes, means for mounting the sense frame on the substrate and permitting the sense frame to rotate about the first, second, and third input axes independently of one another, a plurality of proof masses having predetermined drive axes in the plane with at least two drive axes forming an angle with one another which is larger than 0 and less than 180 degrees, means for mounting the masses on the sense frame and constraining each mass for linear movement relative to the sense frame along the drive axis of the mass in drive-mode and for rotation with the sense frame in sense modes, means for coupling the proof masses together to form a single drive-mode oscillation, actuation means for driving the masses to oscillate in drive-mode, detection means for monitoring sense mode rotation of the proof masses and the sense frame about the first, second, and third input axes in response to Coriolis forces produced by rotation of the masses about the first, second, and third input axes respectively.

2. The angular rate sensor of claim 1 wherein the proof masses are generally planar and disposed in the plane around a center so that their drive axes intersect one another approximately at the center.

3. The angular rate sensor of claim 1 wherein said means for mounting each mass on the sense frame comprises a set of flexures, which are relatively flexible in the direction along the drive axis of the mass, but relatively stiff in other directions.

4. The angular rate sensor of claim 1 wherein said means for coupling the proof masses comprises a plurality of coupling structures connected between adjacent ones of the masses.

5. The angular rate sensor of claim 4 wherein each said coupling structure is a link beam, which is disposed between two adjacent masses and extends along a direction that forms predetermined angles to the drive axes of the two masses.

6. The angular rate sensor of claim 4 wherein each said coupling structure is a box spring, which is disposed between two adjacent masses and oriented with its longitudinal axis forming predetermined angles to the drive axes of the two masses.

7. The angular rate sensor of claim 1 wherein said means for coupling the proof masses comprises a plurality of coupling structures connected between adjacent ones of the masses with at least one member of each coupling structure mounted on the sense frame.

8. The angular rate sensor of claim 7 wherein each said coupling structure comprises a pair of tilt beams joined at one end to form a joint, with the other ends connected to two adjacent masses respectively, each of said tilt beams being extended in a direction tilted with a predetermined angle from that perpendicular to the drive axis of the mass to which the beam is connected, a supporting beam oriented in a direction which forms predetermined angles to the drive axes, with one end joined to the joint of the tilt beams and the other end mounted to the sense frame.

9. The angular rate sensor of claim 7 wherein each said coupling structure comprises a first pair of tilt beams with one end connected to the masses, each of said tilt beams being extended in a direction tilted with a predetermined angle from that perpendicular to the drive axis of the mass to which the beam is connected, a second pair of supporting beams mounted on the sense frame at one end, with the other end connected to the other end of the first pair of beams to form a first, and second joints respectively, a third pair of transfer beams connected to the first, and second joints at one end respectively and joined together at the other end to form a third joint, the third joint being further mounted to the sense frame by a lateral spring extended in a predetermined direction for constraining the joint for movement perpendicular to that direction.

10. The angular rate sensor of claim 1 wherein said means for mounting and permitting the sense frame to rotate about the first, second, and third input axes comprises a first and second gimbals disposed in the plane and positioned within the sense frame with the first one surrounding the second, an anchor post positioned within the second gimbal and affixed to the substrate, a plurality of flexures connected between the sense frame and the first gimbal and extended in radial directions for constraining the sense frame for rotation about the third input axis relative to the first gimbal, a first pair of torsion beams connected between the first and second gimbals and extended along the first input axis for the first gimbal to rotate relative to the second gimbal about the first input axis, a second pair of torsion beams connected between the second gimbal and the anchor post and extended along the second input axis for the second gimbal to rotate about the second input axis.

11. The angular rate sensor of claim 1 wherein said means for mounting and permitting the sense frame to rotate about the first, second, and third input axes comprises a first and second gimbals disposed in the plane with the first gimbal surrounding the sense frame and the second gimbal surrounding the first one, a plurality of anchor posts positioned surrounding the second gimbal, a first pair of torsion beams connected between the sense frame and the first gimbal and extended along the first input axis for the sense frame to rotate relative to the first gimbal about the first input axis, a second pair of torsion beams connected between the first and second gimbals and extended along the second input axis for the first gimbal to rotate relative to the second one about the second input axis, a plurality of flexures connected between the second gimbal and the anchor posts and extended in radial directions for constraining the second gimbal for rotation about the third input axis.

12. The angular rate sensor of claim 1 wherein said actuation means includes comb drives mounted on at least one of the proof masses.

13. The angular rate sensor of claim 1 wherein said detection means for monitoring sense mode rotation of the masses and the sense frame in response to Coriolis forces includes electrode plates disposed on the substrate beneath the masses and the sense frame to form capacitors with the masses and the sense frame for monitoring the sense rotation about the first, and second input axes, parallel plate capacitors with moving plates mounted on the sense frame and interleaved with stationary plates affixed to the substrate for monitoring the sense rotation about the third axis.

14. An angular rate sensor for detecting rotation, comprising a substrate, a plurality of generally planar proof masses disposed around a center for linear oscillations along multi-directional drive axes which lie in the plane of the masses and intersect one another approximately at the center with at least two drive axes forming an angle with one another which is larger than 0 and less than 180 degrees, coupling structures connected between adjacent ones of the masses for constraining the masses to oscillate in a cooperative manner in drive-mode, comb drives mounted on at least one of the masses for driving the masses to oscillate in drive-mode, a first, second and third mutually perpendicular input axes with the first and second input axes lying in the plane of the masses and the third input axis perpendicular to the plane, a sense frame disposed in the plane of the masses and mounted on the substrate by a suspension structure for rotation about the first, second and third input axes independent of one another, flexures mounting the masses on the sense frame for linear movements relative to the sense frame along the drive axes in drive-mode and for rotation with the sense frame about each input axis in sense modes, and capacitance sensors responsive to sense mode rotation movements of the masses and the sense frame about the first, second, and third input axes in response to Coriolis forces produced by rotation of the masses about the first, second, and third input axes respectively, for monitoring rate of rotation.

15. The angular rate sensor of claim 14 wherein said cooperative manner is in-phase manner.

16. The angular rate sensor of claim 14 wherein said cooperative manner is anti-phase manner.

17. The angular rate sensor of claim 14 wherein said suspension structure includes multiple rotation members connected in series by gimbals.

18. The angular rate sensor of claim 17 wherein said rotation members are disposed within the sense frame.

19. The angular rate sensor of claim 17 wherein said rotation members are disposed surrounding the sense frame.

20. An angular rate sensor for detecting rotation, comprising at least one input axis, each being pre-selected from three mutually perpendicular axes, a plurality of proof masses, a plurality of coupling structures with each one connected between two adjacent masses for coupling the proof masses together for linear drive-mode oscillation along drive axes in a plane formed by the first and second axes of said three mutually perpendicular axes, with at least two masses oscillating along drive axes forming an angle with one another which is larger than zero and less than 180 degrees, means for driving the masses to oscillate in drive-mode, a sense frame disposed in the plane for supporting the masses and mounted for rotation with the masses about each said input axis independent of one another in sense mode in response to Coriolis forces produced by rotation of the masses about the input axis, and means responsive to the rotational movement of the sense frame and the masses about each input axis for monitoring the rate of rotation.

21. The angular rate sensor of claim 20 wherein each said coupling structure comprises a link beam that is disposed between two adjacent masses and extends along a direction that forms predetermined angles to the drive axes of the two masses.

22. The angular rate sensor of claim 20 wherein each said coupling structure comprises a box spring which is disposed between two adjacent masses with its longitudinal axis forming predetermined angles to the drive axes of the two masses.

23. An angular rate sensor for detecting rotation, comprising at least one input axis, each being pre-selected from three mutually perpendicular axes, a plurality of proof masses, a plurality of coupling structures that couple the proof masses together for linear drive-mode oscillation along drive axes in a plane formed by the first and second axes of said three mutually perpendicular axes, with at least two masses oscillating along drive axes forming an angle with one another which is larger than zero and less than 180 degrees, means for driving the masses to oscillate in drive-mode, a sense frame disposed in the plane for supporting the masses and mounted for rotation with the masses about each said input axis independent of one another in sense mode in response to Coriolis forces produced by rotation of the masses about the input axis, means responsive to the rotational movement of the sense frame and the masses about each input axis for monitoring the rate of rotation, and each said coupling structure comprising a pair of tilt beams joined at one end to form a joint, with the other ends connected to two adjacent masses respectively, each of said tilt beams being extended in a direction tilted with a predetermined angle from that perpendicular to the drive axis of the mass to which the beam is connected, a supporting beam oriented in a direction which forms predetermined angles to the drive axes, with one end joined to the joint of the tilt beams and the other end mounted to the sense frame.

24. An angular rate sensor for detecting rotation, comprising at least one input axis, each being pre-selected from three mutually perpendicular axes, a plurality of proof masses, a plurality of coupling structures that couple the proof masses together for linear drive-mode oscillation along drive axes in a plane formed by the first and second axes of said three mutually perpendicular axes, with at least two masses oscillating along drive axes forming an angle with one another which is larger than zero and less than 180 degrees, means for driving the masses to oscillate in drive-mode, a sense frame disposed in the plane for supporting the masses and mounted for rotation with the masses about each said input axis independent of one another in sense mode in response to Coriolis forces produced by rotation of the masses about the input axis, means responsive to the rotational movement of the sense frame and the masses about each input axis for monitoring the rate of rotation, and each said coupling structure comprising a first pair of tilt beams with one end connected to the masses, each of said tilt beams being extended in a direction tilted with a predetermined angle from that perpendicular to the drive axis of the mass to which the beam is connected, a second pair of supporting beams mounted on the sense frame at one end, with the other ends connected to the other end of the first pair of beams to form a first and second joints respectively, a third pair of transfer beams connected to the first and second joints respectively at one end and joined together at the other end to form a third joint, the third joint being further mounted to the sense frame by a lateral spring extended in a predetermined direction for constraining the joint for movement perpendicular to that direction.

* * * * *